United States Patent [19]
Deo et al.

[11] Patent Number: 5,721,781
[45] Date of Patent: Feb. 24, 1998

[54] AUTHENTICATION SYSTEM AND METHOD FOR SMART CARD TRANSACTIONS

[75] Inventors: Vinay Deo, Redmond; Robert B. Seidensticker, Woodinville; Daniel R. Simon, Redmond, all of Wash.

[73] Assignee: Microsoft Corporation, Redmond, Wash.

[21] Appl. No.: 531,567

[22] Filed: Sep. 13, 1995

[51] Int. Cl.[6] .................................................. H04K 1/00
[52] U.S. Cl. .................................................. 380/25; 380/23
[58] Field of Search .................................. 380/23, 24, 25

[56] References Cited

U.S. PATENT DOCUMENTS

| | | | |
|---|---|---|---|
| 4,969,189 | 11/1990 | Ohta et al. | 380/25 |
| 5,140,634 | 8/1992 | Guillou et al. | 380/23 |
| 5,276,311 | 1/1994 | Hennige | 235/380 |
| 5,473,690 | 12/1995 | Grimonprez et al. | 380/24 |
| 5,544,246 | 8/1996 | Mandelbaum et al. | 380/24 |

*Primary Examiner*—David C. Cain
*Attorney, Agent, or Firm*—Lee & Hayes, PLLC

[57] ABSTRACT

An authentication system includes a portable information device, such as a smart card, that is configured to store and process multiple different applications. The smart card is assigned its own digital certificate which contains a digital signature from a trusted certifying authority and a unique public key. Each of the applications stored on the smart card is also assigned an associated certificate having the digital signature of the certifying authority. The system further includes a terminal that is capable of accessing the smart card. The terminal has at least one compatible application which operates in conjunction with an application on the smart card. The terminal is assigned its own certificate which also contains the digital signature from the trusted certifying authority and a unique public key. Similarly, the application on the terminal is given an associated digital certificate. During a transactional session, the smart card and terminal exchange their certificates to authenticate one another. Thereafter, a smart card application is selected and the related certificates for both the smart card application and the terminal application are exchanged between the smart card and terminal to authenticate the applications. Additionally, the cardholder enters a unique PIN into the terminal. The PIN is passed to the smart card for use in authenticating the cardholder. The three-tiered authentication system promotes security in smart card transactions.

21 Claims, 6 Drawing Sheets

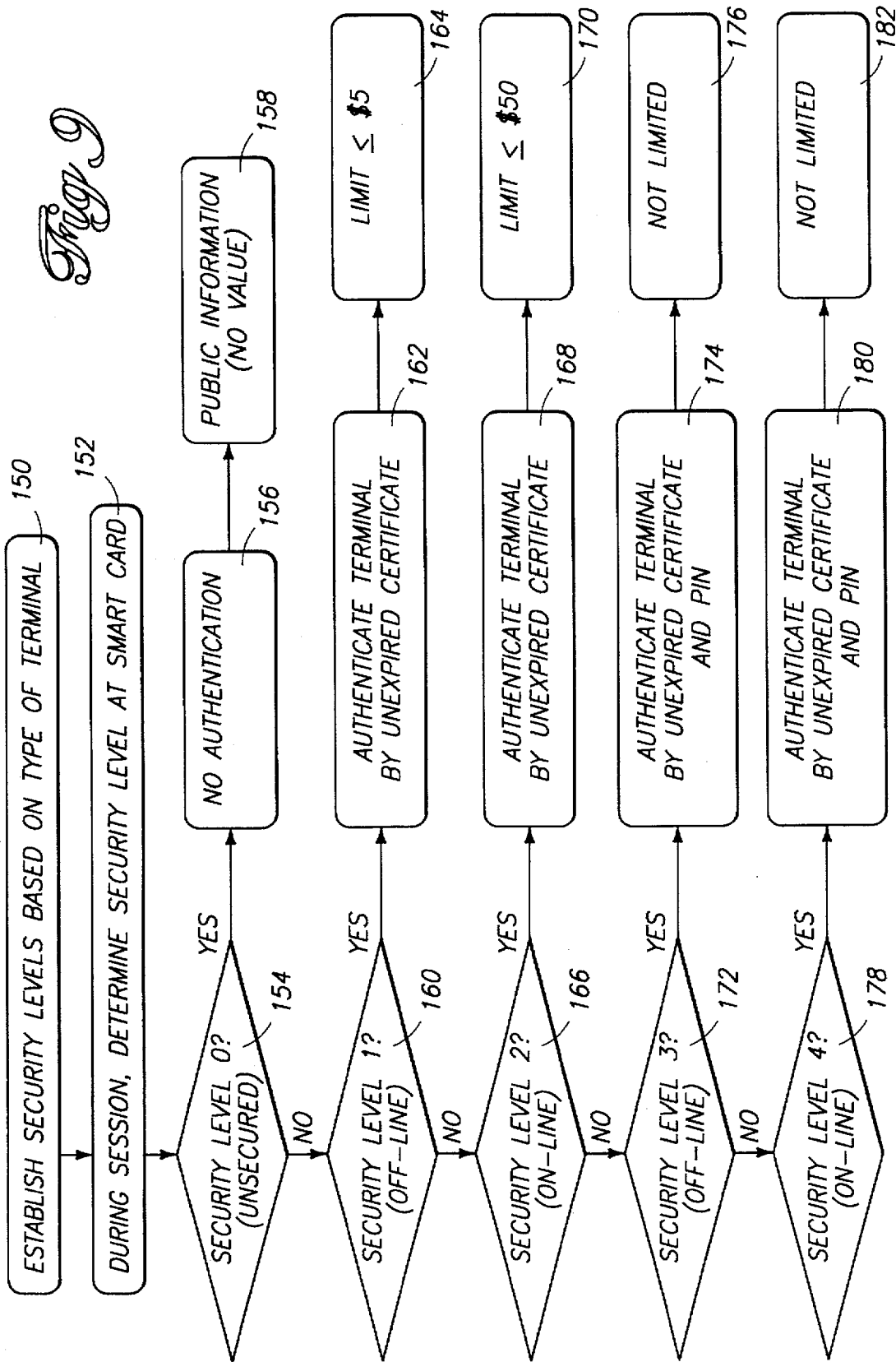

AUTHENTICATION SYSTEM AND METHOD FOR SMART CARD TRANSACTIONS

TECHNICAL FIELD

This invention relates to portable information devices, such as smart cards, personal digital assistants, pagers, and other personal information managers, and the mechanisms used to access these devices. This invention is particularly well suited for smart card systems, including the smart cards themselves, cardholders, and terminals into which the smart cards are inserted for various transactions. More particularly, this invention relates to systems and methods for authenticating smart cards, applications, cardholders, and terminals to protect against fraudulent transactions.

BACKGROUND OF THE INVENTION

Authentication systems are used for security purposes to verify the authenticity of one or more parties during a transaction. Traditionally, authentication systems have been manual, involving simple personal recognition or quick verification of the party via some form of additional identification. One very familiar authentication process occurs when purchasing an item with a personal check. The sales clerk will process the check only if he/she recognizes the person writing the check or if the person presents another piece of identification (e.g., a credit card, or driver's license) to verify the authenticity of that person who is offering the check. Another common manual authentication process might occur in an apartment building or at work where a person is authenticated by a security guard or receptionist through visual recognition.

Some authenticating systems are electronic. A familiar electronic authentication system is used in a common ATM (Automated Teller Machine). Bank members are issued special ATM cards for use in the ATMs to permit automated access to the member's account. The ATM cards that are primarily in use today consist of magnetic-stripe memory cards that have a single magnetic stripe on one side. The magnetic stripe contains information regarding the bank, the member, and his/her account. To guard against unauthorized access, the member is also given a multi-digit password or PIN (Personal Identification Number). The member inserts the mag-stripe card into the ATM and enters a four digit password or PIN (Personal Identification Number). The PIN authenticates for the ATM that the person standing at the ATM is the member who owns the inserted ATM card (or an authorized person representing that member).

Mag-stripe cards are limited, however, in that they are single purpose cards. For instance, one mag-stripe ATM card is used solely for interfacing with a bank ATM, while another mag-stripe card is used solely for frequent flyer mileage, while another mag-stripe card is used solely for making long distance telephone calls.

Today, there is a movement toward use of "smart cards" instead of mag-stripe cards. A "smart card" is a credit card that has a built-in microcontroller (MCU) which enables the card to modify, or even create, data in response to external stimuli. The microcontroller is a single-wafer integrated circuit (IC) which is mounted on an otherwise plastic credit card.

By virtue of the resident on-chip processor, smart cards are self-validating and can authenticate various passwords off-line without connection to a back end computer. Some conventional smart cards perform an authentication procedure during each "session", which is the period of time that the smart card is inside of a compatible terminal. The session commences with a system startup phase. Since the card has no power supply of its own, the system startup phase consists of supplying power to the card and performing a "cold" boot to establish communication between the card and terminal. Thereafter, the card and terminal enter an authentication phase where the terminal verifies that it is communicating with an authorized card. This usually entails the smart card forwarding its own access code to the terminal for verification. Following authentication, one or more transactions are conducted and the card is removed from the terminal, ending the session.

In conventional smart card systems, however, the cards have been designed to hold just one application. One smart card might be used for a banking/financial application, while another smart card might be dedicated to a security application for entry to a building or workplace, while yet another smart card might be dedicated to a health related application. In these conventional systems, the authentication phase consists only of verifying that the card is suitable to talk to the terminal, typically via the internal access code. Unfortunately, there is little or no standardization in the smart card arena, and thus many different non-compatible systems are in existence today. This lack of standardization has impeded efforts to produce a smart card capable of handling multiple applications.

As smart cards evolve, however, they are expected to carry multiple applications—such as banking, travel, retail, security, identification, health care, and electronic benefits transfer—on the same card. The same smart card will be used to deposit or withdrawal money from an ATM, keep track of frequent flyer mileage, permit entry into buildings, store the cardholder's health information, and enable purchase of goods and services. With multiple applications, the number and complexity of security issues rise. For instance, the cardholder does not want his/her employer's entrance security system which interfaces with a security application on the smart card to gain access to sensitive health care information stored on the same health card, nor does the cardholder wish for his/her a doctor to use the health care application to gain access to personal financial information.

It is therefore one object of this invention to provide an authentication system for ensuring the security of the smart card and the applications contained thereon.

Because all smart card transactions are conducted electronically, there is an additional need to ensure for the smart card that the terminal asking for the information is authenticate, and not a fraudulent machine. In other words, there is a need for an authentication system that enables a smart card and terminal to trust each other, as well as verifying that the present cardholder is authenticate. It is another object of this invention to provide such an authentication system.

SUMMARY OF THE INVENTION

This invention provides a smart card authentication system that verifies the user, smart card, application, and terminal.

In one preferred implementation, the system has a smart card that is configured to store and process multiple different applications. The smart card is assigned its own digital certificate which contains a unique public key and a digital signature from a trusted certifying authority. Each of the applications stored on the smart card is also assigned an associated certificate having the digital signature of the certifying authority.

The system also includes a terminal that is capable of accessing the smart card. The terminal has at least one compatible application which operates in conjunction with at least one corresponding application stored on the smart card. The terminal is assigned its own certificate which contains a unique public key and the digital signature from the trusted certifying authority. Similarly, the application on the terminal is given an associated digital certificate.

During a transactional session, the smart card and terminal exchange their certificates over an unsecured communication path. The path is unsecured in the sense that any party can intercept and decipher the message. Following this exchange, the smart card and terminal each process the other's certificate to verify the authenticity of the other. After this initial authentication, a secure communication path is established between the smart card and terminal using encryption techniques and each others' public keys. While third parties might still be able to intercept the encrypted messages, they would not be able to decipher them. Thereafter, an application is selected and the application-related certificates of the smart card application and terminal application are encrypted and then exchanged over the secure communication path. The smart card and terminal then authenticate the application using the exchanged certificates.

As a further level of security, a unique PIN is assigned to the cardholder. During the transactional session, the cardholder enters the PIN into the terminal, which then passes the PIN to the smart card. The smart card compares this PIN with the correct PIN kept in its memory to authenticate the cardholder.

According to another aspect of this invention, a multi-level security protocol is established based upon the types and inherent security of different terminals. The security protocol enables the smart card to be used in many diverse applications, from transferring large sums of money between bank accounts to purchasing a fifty cent soda pop. According to the protocol, security levels are assigned to different types of terminals. The security levels have associated value limits that are imposed for any transaction occurring at the respective terminal. The certificate assigned to a particular terminal contains information pertaining to its type. From this information, the smart card can determine the security level for that particular terminal. The smart card then limits the value of the transaction in accordance with the guidelines associated with the security level.

According to another aspect of this invention, a smart card that is specially configured to operate in the authentication system is described. It is noted that although the smart card embodiment is preferred, aspects of this invention can be implemented in other embodiments of portable information devices, such as personal digital assistants, pages, and electronic programmable watches.

According to another aspect of this invention, a method for authenticating a transaction between a smart card and terminal is also disclosed.

According to yet another aspect of this invention, a method for conducting a smart card transaction using a multi-level security protocol is described.

BRIEF DESCRIPTION OF THE DRAWINGS

FIG. 9 is a flow diagram of a method for conducting a smart card transaction using a multi-level security protocol according to another aspect of this invention.

DETAILED DESCRIPTION OF THE PREFERRED EMBODIMENT

This invention concerns authentication schemes and is described in the preferred context of smart cards. However, this invention may be used in conjunction with other small programmable portable information devices, in place of smart cards. Such portable information devices include pagers, personal digital assistants, personal information managers, and programmable watches. One notable watch that can be used in the context of this invention is the commercially available Timex® Data-Link® watch. As used herein, "portable information device" means a small, portable, electronic apparatus that has limited processing capabilities, limited or no power resources, limited rewritable memory capacity, and is designed to interface with external read/write equipment.

Figure 1:
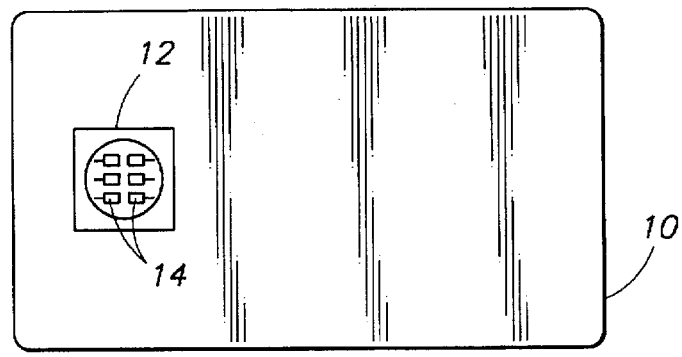
FIG. 1 is a diagrammatic illustration of a smart card.

FIG. 1 shows a smart card 10. It is the size of a credit card and has a built-in microcontroller (MCU) 12 which enables the card to modify, or even create, data in response to external stimuli. Microcontroller 12 is a single wafer integrated circuit (IC) which is mounted on an otherwise plastic credit card. Conductive contacts 14 are shown formed on the IC to enable interfacing to external read/write equipment. In other embodiments, however, the smart card can be configured without physical contacts. Such contactless cards receive information via proximity couplings (e.g., magnetic coupling) or via remote coupling (e.g., radio communication). A smart card is physically constructed in accordance with the international standard ISO-7816 which governs size and bendable limits of the plastic card, as well as size and location of the silicon integrated circuit.

Figure 2:
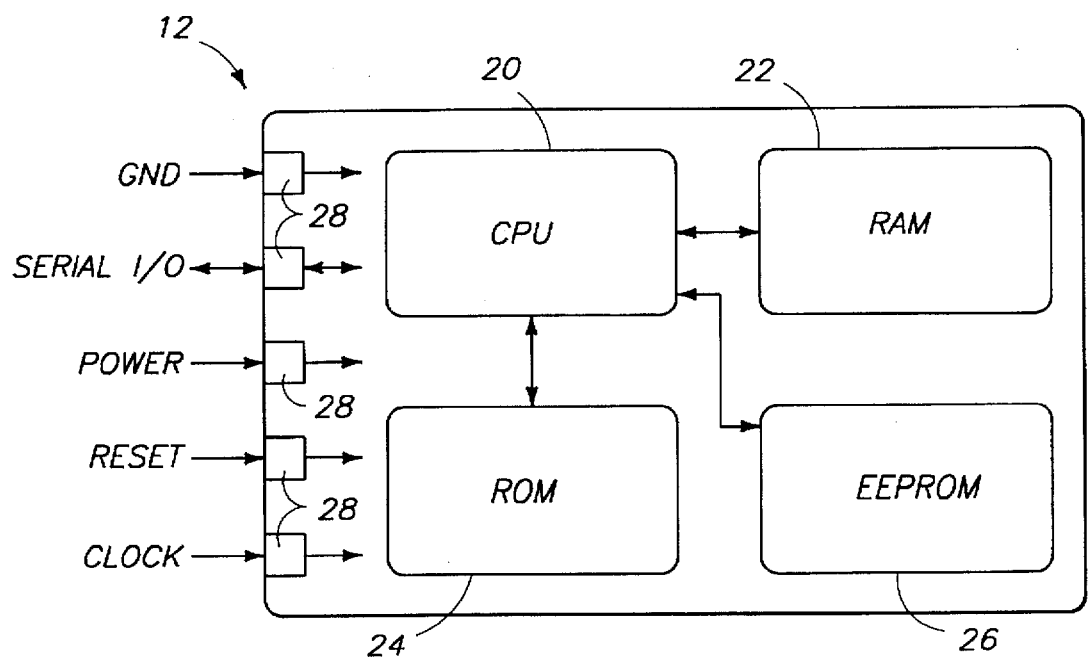
FIG. 2 is a block diagram of a microcontroller integrated circuit used in the FIG. 1 smart card.

FIG. 2 shows smart card microcontroller IC 12 in more detail. It includes a CPU 20, a volatile rewritable RAM (Random Access Memory) 22, a ROM (Read Only Memory) 24, and an EEPROM (Electrically Erasable Programmable ROM) 26. A set of I/O ports 28 are internally coupled to CPU 20 to supply data and control information that are received from the external accessing equipment. As an example, clock, reset, power, data I/O, and ground are provided at I/O ports 28. One suitable microcontroller-based single-wafer IC that can be used in smart cards is available from Motorola Corporation under model number MC68HC05SC21. In this chip, the data I/O is serial.

In this invention, smart card 10 contains multiple different applications and can be concurrently used in many different domains. For instance, smart cards can be used to store financial data for banking purposes, maintain medical information for use by health care providers, track frequent flyer mileage for the cardholder or airline, permit selective entrance into secure facilities, manage electronic benefits, or organize account information for routinely paid services such as cable TV. ROM 24 stores the multiple applications.

This invention concerns an authentication system which verifies the authenticity of the interested components prior to conducting a transaction. For purposes of continuing discussion, aspects of this invention will be described in the context of employing smart cards to manage financial data. In this context, one of the applications stored on the smart cards relates to managing banking and other financial data.

Figure 3:
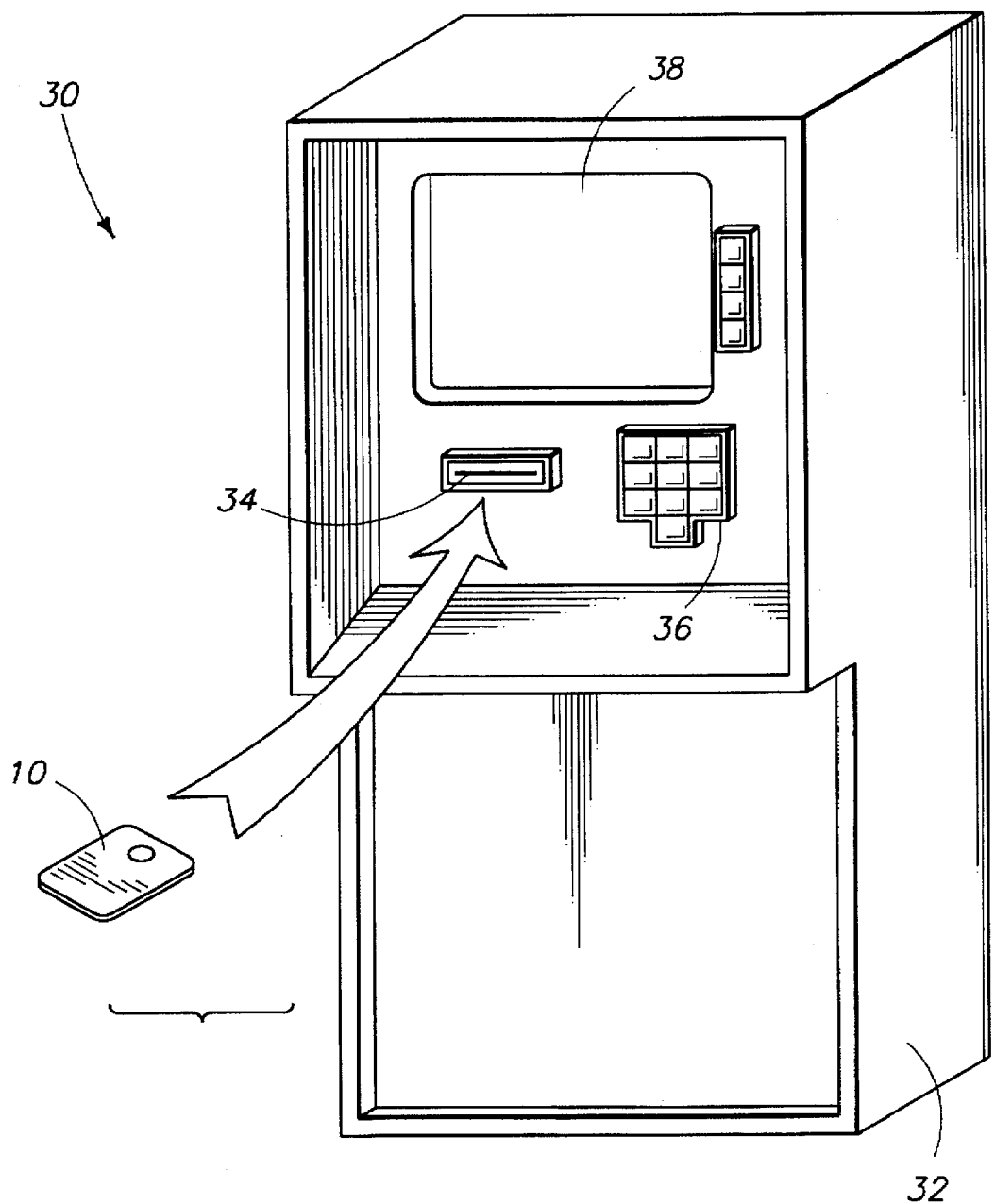
FIG. 3 is a diagrammatic illustration of an authentication system in the context of an ATM banking system according to an example embodiment of this invention.

FIG. 3 shows a smart card authentication system 30 in the context of an ATM banking system. Smart card authentication system 30 includes smart card 10 and a smart card terminal 32, which is embodied as an ATM. The ATM has a card reading slot 34, a keypad 36, and a display 38. The terminal has software resident thereon, or on a remote on-line computer, which consists of at least one application that is compatible, and operates in conjunction, with the corresponding financial application stored on the smart card.

When the cardholder wishes to make a financial transaction, the cardholder begins a transactional session by inserting smart card 10 into a card reading slot 34 of the ATM. A "session" is the period of time that the smart card is inside terminal 32. The session commences with a system startup phase. Since smart card 10 has no power supply of its own, the system startup phase consists of supplying power to the card and performing a "cold" boot to establish communication between the card and terminal. The terminal sends a reset signal and the card responds to the reset signal to establish communication modes and options.

Since the smart card 10 stores multiple applications, a target application is selected from among the multiple applications. In the continuing example, the target application is the financial application. The target application might be selected in a number of ways, including both manual and automated techniques. For example, the smart card itself might select the target application that is suited for the particular terminal. Alternatively, the terminal might decide which of the applications stored on the smart card is compatible with the application resident at the terminal. As another example, the user might select the appropriate application at the beginning of a session.

Thereafter, the smart card and terminal enter the authentication phase which is the primary subject of the this invention. During the authentication phase, the terminal verifies that it is communicating with an authorized smart card, and the smart card verifies that it is talking to an authorized terminal. According to an aspect of this invention, the authentication phase further authenticates the selected target application that is resident on the smart card as well as the compatible application resident on the terminal. Moreover, the authentication technique of this invention authenticates the cardholder to the smart card. This multi-level authentication promotes highly secure transactions.

To enable such high security authentication, the authentication scheme of this invention involves assigning unique identifications to the smart card, terminal, cardholder, and each application on the card. At their simplest form, the unique identifications might consist of special passwords assigned to each of these participants. In the preferred implementation, however, digital certificates are assigned to the smart card, terminal, cardholder, each application on the card, and the application(s) stored on the terminal. A digital certificate is a packet of unique information in digital data form that is used for identification of a party in the encryption arena. The certificate is issued by an independent and trusted third party, known as the "certifying authority". Every participant, including the smart card, the terminal, and the cardholder, trust the certifying authority. Example certifying authorities in the financial environment include the federal reserve or a bank.

Each assigned certificate contains an expiration date, the holder's serial number, a public encryption key unique to the holder, information pertaining to the domain or environment within which the holder may operate (e.g., financial, frequent flyer, health, etc.), and any other information appropriate to establish communication. Thus, the smart card has its own unique public key, as does the terminal and each application.

Before continuing discussion on the authentication system, it would be beneficial to briefly discuss encryption techniques, and how the digital certificates are used. There are different encryption techniques available and in use today. This invention can be used with any type of encryption technique. For the sake of explanation, the basics of one common encryption technique known as "RSA" (an acronym based on the initials of the creators of the encryption algorithm) are described below.

RSA encryption makes use of special mathematical functions referred to as "one-way" functions. According to one-way functions, one or more starting parameters can undergo a function to yield an intelligible result, but the inverse function operating on this result will not produce the starting parameters. In mathematical terms, a one-way function is represented as follows:

$$F(a)=b, \text{ but } F^{-1}(b) \neq a.$$

Such functions are used to produce private and public keys which are assigned to every party that wishes to participate in encrypting messages. The key set is unique and has the property that if one knows the public key $K_{public}$, one cannot guess the private key $K_{private}$. The public key $K_{public}$ is published for everyone to use, while the private key $K_{private}$ is kept secret by the holder.

For a message M that is encrypted via an encryption function E using one of the keys K, the following holds for this function:

$$E(K_{public}, M) = M_{encrypted\_1}$$

$$E(K_{private}, M_{encrypted\_1}) = M$$

but, $$E(K_{public}, M_{encrypted\_1}) \neq M$$

Additionally, $$E(K_{private}, M) = M_{encrypted\_2}$$

$$E(K_{public}, M_{encrypted\_2}) = M$$

but, $$E(K_{private}, M_{encrypted\_2}) \neq M$$

Accordingly, in the context of our ATM example, if the smart card encrypts a message using the terminal's public key, only the terminal can decrypt it. Conversely, if the smart card encrypts a message using its private key (which only the smart card can do since no one else has access to this private key), any other party can decrypt the text using the smart card's public key which is widely known.

To establish communication, the smart card uses the terminal's public key that it received in the terminal's certificate to send a message. Only the terminal can decrypt the message using its private key. Similarly, the terminal can encrypt a reply message using the smart card's public key and only the smart card can decrypt the message. This raises a new issue. When the terminal or smart card receives an encrypted message that is supposedly from the other, how does the receiving party really know if it came from the other?.

To solve this dilemma, encryption algorithms introduce "digital signatures" which are employed to ensure that the appropriate parties are communicating with each other. Thus, when the smart card encrypts a message using the terminal's public key, it tags a personalized digital signature onto the message. The smart card encrypts the combined message using its own private key. The resulting communication is represented as follows:

$$E(K_{SC\_private}, E(K_{T\_public}, M)+SC\ Signature)$$

The terminal receives the communication and decrypts it using the smart card's public key. This decryption yields a scrambled part that contains the encrypted message and a legible part that consists of the smart card's signature. Since the communication was decrypted using the smart card's public key, it follows from the above discussion of the one-way encryption function E that only the smart card (using its private key) could have encrypted the entire communication. Thus, upon seeing the smart card's digital signature, the terminal is assured that the communication truly came from the smart card. The terminal discards the digital signature and then decrypts the other part using its own private key to obtain the original message M.

Note that any party can intercept the communication between the smart card and terminal and use the smart card's public key to determine that the communication came from the smart card. However, that intercepting party cannot decipher the encrypted message because they do not know the terminal's private key.

This encryption scheme therefore ensures for the receiving party (i.e., the terminal in this example) that the communication is from the desired sending party (i.e., the smart card) and that only the receiving party can read the original message.

The encryption scheme only works, however, if the terminal and smart card trust each other's identity. Accordingly, the "certifying authority" is introduced as a trusted third party to the transaction. The terminal and smart card each prove their identity to the satisfaction of the certifying authority and deposit their public keys with this authority. In turn, the certifying authority issues a digital certificate that contains an expiration date, the holder's serial number, a public encryption key unique to the holder, information pertaining to the domain or environment within which the holder may operate (e.g., financial, frequent flyer, health, etc.), and any other information appropriate to establish communication. The identification information is encrypted using the certifying authority's private key, as follows:

$$Certificate=E(K_{CA\_private}, \text{"Expiration, Card Serial\#, } K_{SC\_public}, \text{ etc."})$$

During the initial communication in the authentication phase, the smart card and terminal exchange their certificates. Both the smart card and terminal decipher the other's certificate using the certifying authority's public key. The smart card and terminal can be assured that it is the other legitimate party if the certificate deciphers into intelligible information. It is practically impossible for either the terminal or smart card to construct a fraudulent certificate because neither knows the private key of the certifying authority.

Figure 4:
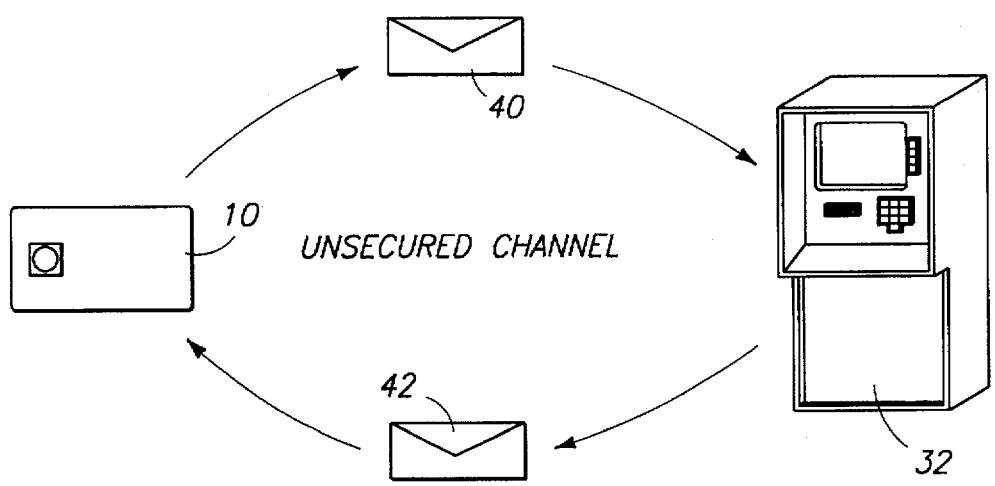
FIG. 4 is a diagrammatic illustration of an initial step of an authentication process of this invention involving the exchange of digital certificates between a smart card and terminal.
Figure 5:
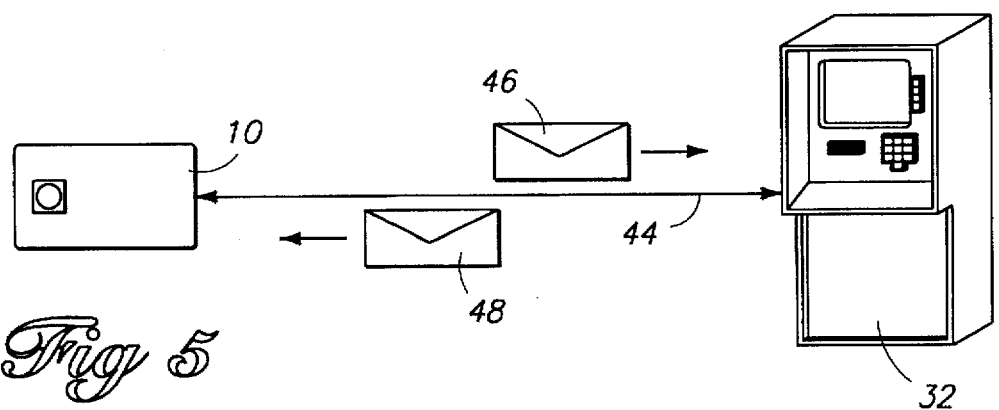
FIG. 5 is a diagrammatic illustration of another step of the authentication process involving the exchange of application-related digital certificates between a smart card and terminal.
Figure 6:
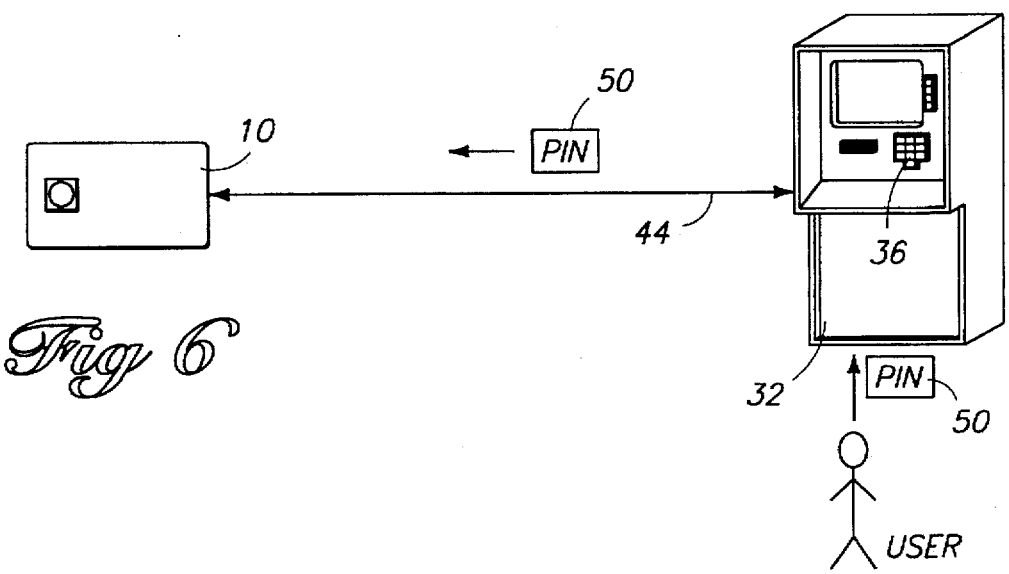
FIG. 6 is a diagrammatic illustration of another step of the authentication process involving the authentication of a cardholder via his or her PIN.

To continue discussion of the authentication process of this invention, please refer to FIGS. 4–6 which diagrammatically illustrate authenticating a financial transaction at an ATM smart card terminal. Following the startup phase, smart card 10 and terminal 32 exchange their respective certificates as shown in FIG. 4. More particularly, smart card 10 sends its card-related certificate 40 to terminal 32 and the terminal sends its terminal-relates certificate 42 to smart card 10. These initial certificates are sent over an open, unsecured channel.

It is noted that the communication channel in an ATM is likely to be a direct or proximal coupling between the smart card and terminal. However, in another implementation, a terminal might be communicating remotely with a personal digital assistance or watch via radio or optical communication. Accordingly, this invention contemplates various electronic and communication means for exchanging certificates over an unsecured communication path, including direct and remote coupling. An example direct exchanging means includes hardware and software in the terminal's and smart card's CPUs for coordinating digital transfer of certificates over physical conductors present in both the terminal and smart card. Example remote exchanging means include components (hardware, software, transmitters, receivers, etc.) used to enable the swapping of certificate using optical transmission, radio transmission, magnetic transmission, or infrared transmission.

As shown in FIG. 5, terminal 32 and smart card 10 use the certificates to establish the authenticity of each to the other. The smart card, for example, has decryption firmware loaded in its CPU to decipher the certificate from terminal 32 using the certifying authority's public key in the manner described above. The smart card CPU learns the identity of the terminal from the deciphered certificate. This permits the smart card to verify the authenticity of the terminal. The terminal has a similar intelligence to verify the authenticity of the smart card.

The smart card and terminal also use each others' public keys obtained from the certificates to create an encrypted communication channel 44 that is secure to outsiders. Although outsiders can still intercept messages, they will not be able to decipher them for the reasons given above during discussion of basic encryption schemes.

FIG. 5 also shows a second authentication level according to this invention. Once communication between the smart card and terminal is established, one of the many applications stored on the smart card is selected. In our continuing example, the financial/banking application on the card is selected from among other applications (such as frequent flyer mileage, health care, etc.) to interface with the compatible financial/banking application resident at the ATM terminal. The application-related certificates 46 and 48 associated with the selected application are then exchanged between terminal 32 and smart card 10 over encrypted channel 44. These application-related certificates 46 and 48 are used to authenticate the applications resident at the terminal and smart card. That is, the decryption and verification firmware in the smart card CPU and similar software at the terminal use the identification information in the exchanged application-related certificates to authenticate the selected card application and the compatible terminal application.

The additional, application level of authentication enhances security by preventing an unscrupulous party from placing a fake application on an otherwise authenticated terminal or smart card. For instance, a high-tech thief might try to program a smart card with an imitation application designed to access and alter bank records. If the imitation application does not have the necessary certificate and digital signature of a certifying authority, the terminal will quickly ascertain that it is not an authenticate application and reject the smart card as fake before conducting any transaction.

Similarly, the application level authentication helps prevent transactions from occurring at a fraudulent terminal. Suppose, for example, a person was able to load an imitation application on an otherwise authenticated terminal with the intention of gaining access to banking records kept on peoples' smart cards. If the smart card determines that the terminal-resident application is not authenticate, it will cease all communication and forego conducting any transaction.

It is noted that the decryption/verification intelligence provided at both the smart card and terminal form an example authentication means for verifying the authenticity of the smart card, terminal, and applications to each other.

FIG. 6 shows a third level in the authentication scheme of this invention. Thus far only the card, terminal, and application have been authenticated. It is also desirable to verify that the person requesting the transaction is the authorized cardholder. A unique PIN (Personal Identification Number) 50 is assigned to the cardholder. During the authentication phase, a user is requested to enter his/her PIN 50 via input keypad 36. Terminal 32 passes PIN 50 directly to smart card 10 so that it can verify the identity of the cardholder. The smart card compares the entered PIN with a stored PIN that associated with the true cardholder. If the entered PIN matches, the user is deemed authentic to the smart card. This third authentication level even further improves security as now all relevant participants (card, terminal, application, and user) are authenticated.

The transaction phase of the session is preferably conducted only after the multi-level authentication phase is completed. Here, any banking transactions are performed only after the smart card, terminal, application, and user have been authenticated. Only then will sensitive information be permitted to flow between the smart card and terminal. This information is likewise encrypted and sent over secure channel 44. When all desired transactions are conducted, the card is withdrawn from the ATM terminal and the session is terminated.

Figure 7:
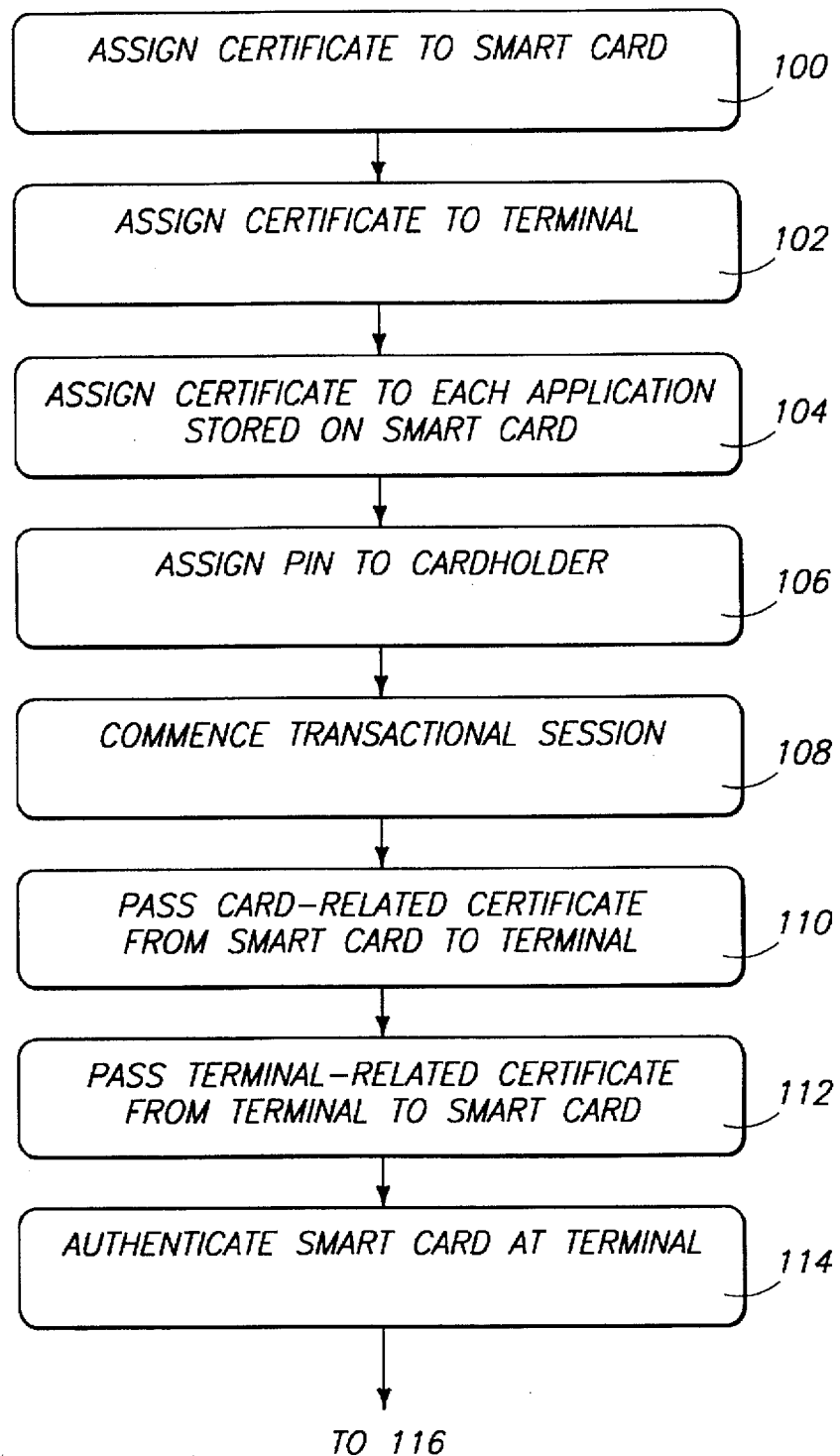
FIGS. 7 and 8 present a flow diagram of a method for authenticating a transaction between a smart card and a terminal.
Figure 8:
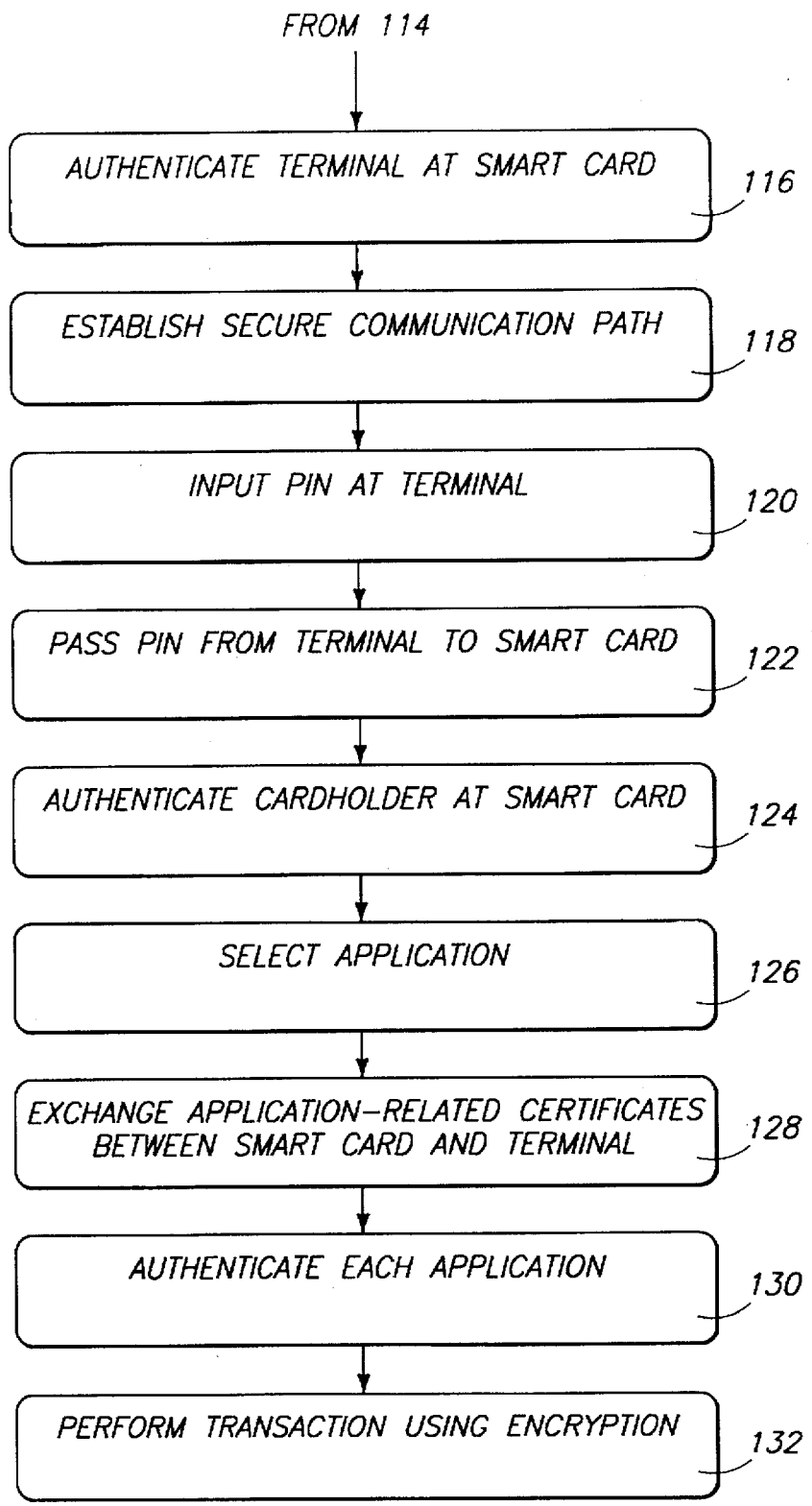

FIGS. 7 and 8 show a method for authenticating a smart card transaction according to this invention. At step 100, a certificate is assigned to the smart card. The card-related certificate has a digital signature of a certified authority and a public key unique to the card for use in data encryption. At step 102, a certificate is assigned to the terminal. In a like manner, the terminal-related certificate has a digital signature of the certified authority and a public key unique to the terminal. At step 104, a certificate is assigned to each application stored on the smart card and to the application at the terminal. Each application-related certificate also contains a digital signature of the certified authority and a public key unique to the associated application. At step 106, a unique PIN is assigned to the cardholder.

At step 108, a transactional session is commenced between the smart card and the terminal. In our ATM example, the session commences when the smart card is inserted into the card reader slot of the terminal; although in other implementations, the card may not actually be inserted into anything. At step 110, the card-related certificate is passed from the smart card to the terminal. Concurrently, the terminal-related certificate is passed from the terminal to the smart card (step 112). The smart card and terminal authenticate each other based upon the information and digital signatures contained in their exchanged certificates (steps 114 and 116).

Through the use of encryption techniques, the messages between the terminal and smart card can now be sent over a communication path that is considered to be secure from the standpoint that third parties will be unable to decipher the exchanged messages (step 118). At step 120, the cardholder enters his/her PIN at the terminal. The PIN is passed from the terminal to the smart card so that the smart card can authenticate the user (steps 122 and 124).

At step 126, one of the applications stored on the smart card is selected. As noted above, this selection might be made by the user, the smart card, or the terminal. The application-related certificates are then exchanged between the smart card and terminal (step 128). The identity information and digital signatures of the certifying authority contained in the certificates are used to authenticate each application (step 130). After all three levels of authentication—smart card/terminal, cardholder, and application—the desired transaction(s) is performed (step 132) using encrypted information exchanged between the terminal and smart card.

In the above ATM example, the three-tiered authentication system is used because it yields a highest security level. However, there are other applications and environments where such high security is not important. For instance, suppose that a terminal is configured as a soda pop machine. It would be desirable to permit the smart card to make the purchase of an inexpensive soda pop drink without having to go through the multiple authentication steps. In this case, it might be enough security to simply authenticate the terminal by examining if it has an unexpired certificate.

This leads to another aspect of this invention. The authentication system of this invention can be configured to accommodate different security levels. Preferably, the security levels are established based upon the type of terminal. In general, there are three types of terminals: unsecured, secured off-line, and secured on-line. An unsecured terminal is one that has not been authenticated. A secured off-line terminal is one that is an off-line stand alone machine (i.e., one that is not connected on-line to another computer system) which has been authenticated by an unexpired certificate. A secured on-line terminal is one that is on-line with another computer system and has been authenticated by an unexpired certificate.

The type of terminal is added as part of the identity information contained in the terminal-related certificate. Different security levels are established based upon these terminal types. During a transaction, the appropriate security level is ascertained by the smart card based upon the terminal type information contained in the terminal-related certificate. In addition, value limits can be set for associated security levels for any transaction that is conducted during a transactional session. The following table provides an example implementation of a five-level security protocol according to this invention.

| Security Level | Terminal Type | Value | Example Application |
| --- | --- | --- | --- |
| 0 | Not Authenticated | 0 | Dispatch Name, Address of Firm |
| 1 | Off-Line; Authenticated via Unexpired Certificate | ≦$5 | Soda Pop Machine |
| 2 | On-Line; Authenticated via Unexpired Certificate | ≦$50 | Purchasing Tickets for Sporting Event |
| 3 | Off-Line; Authenticated via Unexpired Certificate and User PIN | No Limit | Long Distance Telephone Call |
| 4 | On-Line; Authenticated via Unexpired Certificate and User PIN | No Limit | ATM Transaction |

FIG. 9 shows a flow diagram of a method for conducting a smart card transaction using the security levels from the above table. At step 150, the five security levels are established based upon the different categories of terminals. At step 152, the smart card determines the type of terminal (from the terminal-related certificate) and ascertains the appropriate security level. Depending upon the security level, the authentication system limits the value of a transaction in those instances where low security terminals are involved.

At decisional step 154, it is determined whether the terminal is unsecured, thereby having a security level 0. If it is (i.e., the "yes" branch), there is no way to authenticate the terminal (step 156) and thus no way to trust the terminal. As a result, the smart card will only output public information, such as the cardholder name, address, and social security number (step 158).

If the terminal is not at security level 0 (i.e., the "no" branch from step 154), the terminal is checked for the next security level 1 at step 160. If the terminal is an off-line terminal which has an unexpired certificate but does not require a PIN entry, the smart card designates this terminal as having a security level 1 which requires authentication of the terminal and application (step 162). Since there is less security in an off-line terminal, the value limit for any transaction at a level 1 terminal is less than or equal to five dollars (step 164).

At step 166, the smart card ascertains whether the terminal has a security level 2, meaning that the terminal is an on-line terminal which has an unexpired certificate but does not require a PIN entry. If the terminal meets this profile, the smart card authenticates the terminal and selected target application (step 168) and all transactions are limited to a slightly higher amount, say $50 (step 170).

At step 172, the smart card examines whether the terminal satisfies the profile for a security level 3, which is an off-line terminal having an unexpired certificate and requiring a PIN entry. If it satisfies the profile, the full three-level authentication scheme described above in detail is undertaken to authenticate the terminal, smart card, application, and cardholder (step 174). In this example, the value of this transaction is not limited to a specific dollar amount (step 176).

Finally, at step 178, the smart card determines whether the terminal is at the highest security level 4, meaning that the terminal is an on-line terminal which has an unexpired certificate and requires PIN entry. If the terminal is a level 4, the full authentication process is used (step 180) and the transactional value is not limited (step 182).

The multi-level security protocol promotes varying degrees of security depending upon the type of terminal and transaction to be undertaken. As a result, the smart card has tremendous flexibility and can be used for many different applications. For example, the same smart card can be used to transfer thousands of dollars between bank accounts or to buy a fifty cent soda pop drink. By limiting the dollar amount of transactions in less secure terminals, the smart card protects the cardholder's assets from any attempt to gain fraudulent access to them.

Another aspect of this invention concerns a smart card that is constructed to operate within the authentication system described above. With reference again to FIGS. 1 and 2, smart card 10 of this invention has memory (in the form of RAM 22, ROM 24, EEPROM 26, and possibly some limited memory within CPU 20) which can be used to store its card-related certificate, multiple applications, and corresponding application-related certificates for each application. As noted above, these applications may be in many diverse environments, including health care, financial/banking, frequent flyer, etc. One application might also be in the form of a file system capable of maintaining data in multiple different files. Such an application enables newly issued smart cards to be backwards compatible to emulate earlier versions of a smart card. The file systems are preferably constructed in compliance with the standards set forth in ISO 7816.

Smart card 10 also has a processor 20 which is programmed to: (1) output the card-related certificate to a terminal and to receive a terminal-related certificate from the terminal; (2) authenticate the terminal based upon the received terminal-related certificate; (3) select an application from among the multiple applications stored in the memory; (4) output an application-related certificate for the selected target application and receive an application-related certificate of a corresponding application resident at the terminal that is compatible with the selected application; and (5) authenticate the application resident at the terminal based upon the received application-related certificate therefrom. The processor has appropriate encryption/decryption software to enable it to send and receive encrypted messages.

In addition, the smart card is constructed to authenticate the cardholder via his or her associated PIN. The smart card has the correct PIN stored in its memory. When the entered PIN is received from the terminal, the smart card compares the entered PIN with the stored PIN to verify the authenticity of the cardholder.

The invention is not limited to the specific embodiments described in this specification, but shall be construed to cover equivalent embodiments.

We claim:

1. A method for authenticating a transaction between a portable information device and a terminal, the portable information device storing a device-related certificate unique to the device and the terminal storing a terminal-related certificate unique to the terminal which includes information regarding a type of terminal, the method comprising the following steps:

exchanging the device-related and terminal-related certificates between the portable information device and the terminal during a transaction;

authenticating the portable information device and the terminal to each other using the exchanged device-related and terminal-related certificates;

determining, at the portable information device, a security level for the terminal based on the terminal type information contained in the terminal-related certificate received from the terminal, the security level having an associated value limit for a value of the transaction conducted during the transactional session; and restricting the value of the transaction to the value limit associated with the determined security level.

2. A method as recited in claim 1 and further comprising the additional step of encrypting communication between the portable information device and the terminal during the transaction.

3. A method as recited in claim 1, wherein the portable information device is associated with a user who has a unique PIN, and further comprising the following additional steps:
- receiving the PIN at the terminal during the transaction;
- passing the PIN from the terminal to the portable information device; and
- authenticating the the user at the portable information device.

4. A method for conducting a transaction between a smart card and multiple various types of terminals that are each capable of accessing the smart card during the transaction, each terminal having at least one resident application stored thereon, the method comprising the following steps:
- storing multiple applications on the smart card, the applications being compatible target applications which operate in conjunction with a corresponding said resident application stored on each of the various terminals;
- establishing multiple security levels for corresponding types of terminals, the security levels having associated value limits for limiting a value of any transaction conducted on the corresponding terminal type;
- assigning a card-related certificate to the smart card, the card-related certificate having a digital signature of a certified authority and a public key unique to the smart card for use in data encryption;
- assigning terminal-related certificates to the various types of terminal, each terminal-related certificate having the digital signature of the certified authority and a public key unique to the terminal for use in data encryption, said each terminal-related certificate also having information regarding the type of terminal;
- assigning an application-related certificate to each application stored on the smart card and to the resident applications at the terminals, each application-related certificate having the digital signature of the certified authority and a public key unique to that application;
- commencing a transactional session between the smart card and a particular one of the terminals;
- exchanging the device-related and terminal-related certificates between the smart card and the particular terminal;
- authenticating the smart card and the particular terminal to each other using the exchanged device-related and terminal-related certificates;
- determining the security level for particular terminal, at the smart card, using the terminal type information contained in the terminal-related certificate received from the particular terminal;
- selecting a target application from among the multiple applications stored on the smart card that is compatible with the resident application stored at the particular terminal;
- exchanging, between the smart card and the particular terminal, the application-related certificates assigned to the selected target application stored on the smart card and the resident application stored at the particular terminal;
- authenticating the target and resident applications using their exchanged application-related certificates;
- conducting the transaction after the target application has been authenticated; and
- restricting the value of the transaction to the value limit associated with the security level determined for the particular terminal.

5. A method according to claim 4 and further comprising associating monetary value limits with the different security levels.

6. A method as recited in claim 4 and further comprising the following additional steps:
- associating the smart card with a cardholder;
- assigning a unique PIN to the cardholder;
- inputting the PIN to the particular terminal during the transactional session;
- passing the PIN from the particular terminal to the smart card; and
- authenticating the cardholder at the smart card.

7. A method as recited in claim 6 wherein the multiple various terminals are off-line and on-line types of terminals, the method further comprising the following additional steps:
- establishing a first security level that is associated with an off-line terminal that has an unexpired terminal-related certificate;
- establishing a second security level that is associated with an on-line terminal that has an unexpired terminal-related certificate, the second security level being of higher security than the first security level;
- establishing a third security level that is associated with an off-line terminal that has an unexpired terminal-related certificate and requires the PIN from the cardholder, the third security level being of higher security than the second security level; and
- establishing a fourth security level that is associated with an on-line terminal that has an unexpired terminal-related certificate and requires the PIN from the cardholder, the fourth security level being of higher security than the third security level.

8. A method as recited in claim 7 and further comprising associating monotonically increasing monetary value limits with the first through fourth security levels, respectively.

9. A method as recited in claim 4 and further comprising the additional step of encrypting the application-related certificates before exchanging them using the public keys from the device-related and terminal-related certificates that have already been exchanged.

10. A system comprising:
- a portable information device having a microprocessor capable of processing multiple applications, the portable information device having an associated device-related certificate;
- multiple terminals of various types capable of accessing the portable information device, the terminals having associated security levels wherein the security levels have associated value limits for a value of a transaction, each terminal having an associated terminal-related certificate which contains information pertaining to the terminal type;
- means for exchanging the device-related and terminal-related certificates between a particular terminal and the portable information device; and
- the portable information device having means for determining the security level for a particular terminal based upon the terminal type information contained in a terminal-related certificate associated with the particular terminal.

11. A system as recited in claim 10 wherein the portable information device comprises a smart card.

12. A system as recited in claim 10 wherein the portable information device comprises a portable personal digital assistant.

13. A system as recited in claim 10 wherein the portable information device comprises an electronic watch.

14. A system as recited in claim 10 wherein the portable information device has a file system for managing multiple files.

15. A system as recited in claim 10 and further comprising an input mechanism at the terminal to enable a cardholder to enter a PIN, the terminal transferring the PIN to the portable information device so that the authentication means can verify the authenticity of the cardholder to the portable information device.

16. A portable information device for use in transactions with a terminal, the portable information device comprising:

a memory for storing at least one application;

a processor programmed to: (1) receive a terminal-related certificate from the terminal, the terminal-related certificate containing information pertaining to the type of terminal; (2) authenticate the terminal using the received terminal-related certificate; (3) analyze the terminal type from the information contained in the terminal-related certificate: and (4) limit any transaction to a selected monetary amount based upon the the type of terminal.

17. A portable information device as recited in claim 16 wherein the processor is programmed to encrypt communication output to the terminal and to decrypt communication received from the terminal.

18. A portable information device as recited in claim 16 wherein the memory stores a PIN of an associated user, the processor is further programmed to receive a PIN from the terminal and to authenticate the user based upon the received PIN.

19. A portable information device as recited in claim 16 wherein the memory stores multiple applications and one of the applications comprises a file system capable of managing multiple files.

20. Computer-readable media resident at the portable information device and the terminal having computer-executable instructions for performing the steps in the method recited in claim 1.

21. In a system involving a transaction between a portable information device and a terminal, a computer-readable media provided at the portable information device having computer-executable instructions for performing the following steps:

receiving a certificate from the terminal, the certificate containing information pertaining to a type of terminal;

analyzing the terminal type from the information contained in the certificate; and limiting any transaction with the terminal to a selected value based upon the type of terminal.

* * * * *